United States Patent Office 2,947,748
Patented Aug. 2, 1960

2,947,748

QUATERNARY AMMONIUM COMPOUNDS OF THE UREIDOALKYLAMMONIUM TYPE

Ruth H. Zeitschel, Philadelphia, Pa., assignor to Rohm & Haas Company, Philadelphia, Pa., a corporation of Delaware No Drawing. Filed June 30, 1955, Ser. No. 519,271

14 Claims. (Cl. 260—247.2)

This invention relates to quaternary ammonium compounds of the ureidoalkylammonium type as new compositions of matter and to the method for their preparation.

The compounds of the present invention may be represented by the formula

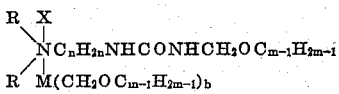

in which R, singly, is a methyl or ethyl group or the two R's, collectively, are a divalent aliphatic chain of four to five atoms which jointly wtih the amino nitrogen form a five- to six-sided heterocycle, X is chlorine, bromine or iodine, $n$ in an integer from two to three, $m$ is an integer from one to five, $b$ is an integer from one to three, and M is a polyvalent, preferably divalent but possibly trivalent or tetravalent, nitrogen-containing quaternizing group, to be more fully explained hereinafter.

The preferred representation of X is chlorine, largely because chlorine compounds are more readily available and correspondingly less expensive than the others. The corresponding bromine compounds are quite effective for the present purposes but are somewhat costlier than the related chlorine compounds and for that reason alone are not as widely employed. Iodine compounds are also satisfactory for the present purposes but they suffer somewhat from unfavorable cost and availability considerations. Nevertheless, chlorine, bromine, and iodine all perform effectively for the instant purposes. It will be evident to one skilled in the art that other anions may be used in place of the halogens, such as sulfate, methylsulfate, phosphate, and the like. The latter anions may be supplied directly or by metathesis with the halide form of the quaternary ammonium compound of this invention. X may be defined as an anion, preferably halide, having a group weight of 35.5 to 127.

R, singly, may represent a methyl or ethyl group or, collectively, and in conjunction with the amino nitrogen, may stand for a morpholino, thiamorpholino, pyrrolidinyl, methylpiperazinyl, or piperidino group, and these groups having an alkyl substituent such as a methyl group.

As integers representing $n$, two and three are used with three being somewhat preferred. When $n$ equals two the group $n$ defines becomes ethylene; when $n$ equals three the group is trimethylene or methylethylene. There must be two to three carbon atoms between the

nitrogen and the urea nitrogen. As integers representing $m$, one to five are employed with one and two being somewhat preferred. As $m$ varies from one to five, the grouping defined with the aid of $m$ becomes hydrogen, methyl, ethyl, propyl, isopropyl, butyl, or isobutyl. The hydrogen and methyl representatives are somewhat preferred.

M is a polyvalent, preferably divalent but possibly trivalent or tetravalent, nitrogen-containing quaternizing group, one valence of which will unite with a tertiary amino nitrogen to form a quaternary ammonium arrangement under present reaction conditions. The other valence or valences of M must be on a nitrogen atom or atoms that will react, under present conditions, with formaldehyde, that is, a nitrogen atom or atoms that can be methylolated under the instant conditions. The group M should preferably contain from two to twenty-one carbon atoms.

In preparing the present quaternary ammonium compounds M is preferably supplied by a compound having the formula $H_bMX$, in which X, as defined previously, is reactive in the quaternization sense, H is a reactive hydrogen atom attached to an amino or amido nitrogen, as the case may be, in the group M, and $b$ is an integer of one of three depending on and varying with the number of methylolatable locations in the group M.

In the compound $H_bMX$ there will always be one quaternizationally reactive X, as defined previously. There may be in the compound $H_bMX$, from one to three reactive hydrogen atoms, i.e., reactive under the present methylolation reaction conditions, to be more fully discussed hereinafter. The symbol $b$, of course, will vary from one to three in order to define the number of reactive hydrogen atoms present in the compound $H_bMX$. There will be other hydrogen atoms present in $H_bMX$, in addition to those symbolized by $H_b$ and such other hydrogen atoms, which are unreactive in the present sense, are encompassed within the definition of M. For instance, if the nitrogen-containing $H_bMX$ compound is chloroacetamide, $ClCH_2CONH_2$, it may be written $ClCH_2CONHH$ or $H(HNCOCH_2)Cl$ to show that, in this illustrative instance, M is $—HNCOCH_2—$, X is chlorine, and $b$ is one. M is, in this instance, divalent. It is to be noted, that in this instance, M includes three hydrogen atoms that are unreactive in the present sense. That is, under present reaction condition, these additional hydrogen atoms will be substantially unreactive in the methylolation reaction, to be more fully described hereinafter. In all instances, the reactive hydrogen or hydrogens, shown as $H_b$, will be reactive in the mentioned methylolation reaction.

As an additional illustration, in order to more clearly define M, assume that $H_bMX$ represents chloroethylmelamine, which may be shown structurally as

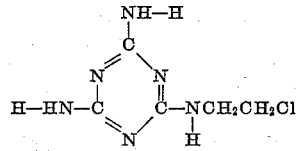

This may be written in conformity with the $H_bMX$ formula as

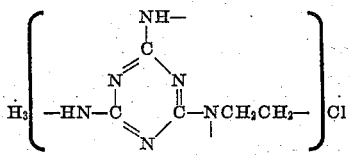

This shows that there are three reactive hydrogen atoms, $H_3$, and, therefore, three locations in M where methylol groups can attach. M, in addition, contains six unreactive hydrogen atoms. M is in this illustration tetravalent, i.e., one valence for X and one valence for each of the three reactive hydrogen atoms. M may be similarly defined in all instances in the present invention by applying the foregoing teachings.

In summation, M must be a polyvalent, i.e., divalent, trivalent, or tetravalent, nitrogen-containing quaternizing group of two to twenty-one carbon atoms. Within the compound $H_bMX$, X must be quaternizationally reactive and $H_b$ must be methylolatably reactive. The valence of M will be one greater than the value of $b$. M must contain a hydrogen-bearing amino or amido group that is susceptible to the addition of a methylol group under the present conditions. The essential characteristics of M, as presented, are its carbon content, its quaternizing properties, its methylolatable amino or amido groups, its attachment to a reactive X, its attachment to at least one reactive hydrogen, and its polyvalent nature.

The compound $H_bMX$ must undergo quaternization under the present reaction conditions, to be more fully described hereinafter. Preferred representations of the compounds $H_bMX$ are haloalkanamides of two to eighteen carbon atoms, haloalkylureas and haloalkanoylureas in which the alkyl portion contains two to eighteen carbon atoms and the alkanoyl portion contains two to eighteen carbon atoms, haloalkylguanamines and haloalkanoylguanamines in which the alkyl portion contains one to eighteen carbon atoms and the alkanoyl portion contains two to eighteen carbon atoms, and haloalkylmelamines and haloalkanoylmelamines in which the alkyl portion and the alkanoyl portion contain two to eighteen carbon atoms. When melamines are employed the substituent group is, of course, positioned on an amino nitrogen. When guanamines are used the substituent group is preferably located on the ring carbon available for such a group but it may be positioned on the amino nitrogen. When the substituent group is positioned on the amino nitrogen it is desirable to have a lower alkyl group positioned on the available ring carbon such as methyl or ethyl. Other compounds may be employed as $H_bMX$ as long as the requirements, already set forth, are met. The representations specifically presented above are preferred. It is desirable in many instances, in the compound $H_bMX$, to have the X in alpha position to functional groups, but this is not a critical restriction.

Typical of the $H_bMX$ compounds that may be employed include chloroacetamide, chloropropanamide, chlorobutanamide, chloropentanamide, chlorohexanamide, chlorooctanamide, chlorodecanamide, chlorododecanamide, chlorotetradecanamide, chlorooctadecanamide, chloroethylurea, chlorobutylurea, chloropentylurea, chloroheptylurea, chlorooctylurea, chlorononylurea, chlorodecylurea, chloroundecylurea, chlorododecylurea, chlorotetradecylurea, chlorooctadecylurea, chloroacetylurea, chloropropanoylurea, chlorobutanoylurea, chloropentanoylurea, chlorohexanoylurea, chlorooctanoylurea, chlorodecanoylurea, chlorooctadecanoylurea, chloromethylguanamine, chloroethylguanamine, chloropropylguanamine, chlorobutylguanamine, chlorooctylguanamine, chlorodecylguanamine, chlorododecylguanamine, chlorooctadecylguanamine, chloroacetylguanamine, chlorobutanoylguanamine, chlorooctanoylguanamine, chlorodecanoylguanamine, chlorooctadecanoylguanamine, chloroethylmelamine, chloropropylmelamine, chlorobutylmelamine, chlorohexylmelamine, chlorodecylmelamine, chlorotetradecylmelamine, chlorooctadecylmelamine, chloroacetylmelamine, chloropropanoylmelamine, chlorobutanoylmelamine, chlorooctanoylmelamine, chlorodecanoylmelamine, chlorotetradecanoylmelamine, and chlorooctadecanoylmelamine. The above compounds may be employed in their various isomeric forms. The guanamine substituent groups listed above may be on either an amino nitrogen or on the available ring carbon atom. The typical compounds listed above have been shown in their chlorine form. Also typical of the compounds that may be used in the present invention are those in the corresponding bromine or iodine form. M may also contain, in place of alkyl groups, alkenyl, alkynyl, alkadienyl, alkoxyalkyl or carboalkoxy groups, as long as the other fundamental requirements of M, as already presented, are complied with.

The quaternary ammonium compounds of this invention are preferably prepared by a multi-step method which includes first reacting urea with a compound having the formula $R_2NC_nH_{2n}NH_2$, in which R and $n$ have the same significance as previously set forth, to form a dialkylaminoalkylurea. This dialkylaminoalkylurea may then be quaternized with an $H_bMX$ compound, previously defined. This quaternized compound is then methylolated and, if desired, etherified. The methylolation and possible etherification occur at at least two locations in the final quaternized compound. One occurrence is at the terminal urea nitrogen as shown previously in the structural formula and at least one other is at the terminal amido or amino nitrogen, as the case may be, of the group M. The methylolation and possible etherification may occur at from one to three locations in M depending on the particular representation of M, as previously indicated. It is vital for the present purposes that the methylolation occur at both possible locations. The etherification, while desirable in many instances, is optional and not essential as is the methylolation. If desired, the methylolation and possible etherification may precede the quarternization. It is also possible, but not particularly convenient, to methylolate and possibly etherify either the dialkylaminoalkylurea or the $H_bMX$ compound, then quaternize, and finally methylolate and optionally etherify the dialkylaminoalkylurea or $H_bMX$ compound not so treated originally. Similar satisfactory results are obtained by any order of steps. In other words, after the urea-amine reaction, which must come first, the order of steps is not critically significant. It is convenient to conduct the quarternization step before the methylolation and possible etherification and, therefore, this is generally the preferred method of operation.

The reaction between urea and the $R_2NC_nH_{2n}NH_2$ compound is readily consummated preferably in the temperature range of about 75° to 200° C. and at atmospheric pressures, although pressures greater than atmospheric may be used, if desired, particularly if it is contemplated to employ reaction temperatures appreciably above the boiling point of the reaction mixture. Equimolecular proportions of reactants are employed and the reaction occurs substantially on a mole or mole basis. Ammonia is evolved as the reaction progresses and the cessation of ammonia evolution is an indication of reaction completion. The resulting compound apparently has the formula $R_2NC_nH_{2n}NHCONH_2$ and represents a dialkylaminoalkylurea.

Typical of the compounds that may be reacted with urea are dimethylaminopropylamine, diethylaminopropylamine, methylethylaminopropylamine, dimethylaminoethylamine, diethylaminoethylamine, methylethylamine, morpholinopropylamine, thiamorpholinoethylamine, pyrrolidinylpropylamine, methylpiperazinylethylamine, and piperidinoethylamine.

The dialkylaminoalkylurea may then be methylolated by reacting it with formaldehyde in the presence of water. Gaseous formaldehyde may be introduced into an aqueous medium containing the dialkylaminoalkylurea or, if desired, aqueous formaldehyde may be employed or alcoholic solution of formaldehyde. Also satisfactory for the present methylolation are revertible polymers of formaldehyde, such as paraformaldehyde.

The methylolation is preferably conducted in the temperature range of room temperature (20° to 30° C.) to about 125° C., depending largely on the particular dialkylaminoalkylurea or $H_bMX$ compound, or both concerned, as the case may be, and the form of formaldehyde used. The preferred range is about 35° to 80° C.

Temperatures appreciably below the normal room temperatures of 20° to 30° C. usually lead to a somewhat sluggish reaction. Actually, it usually takes appreciable cooling to obtain and maintain operating temperatures below room temperatures because of the exothermic nature of the methylol reaction. The extra effort and inconvenience of cooling are not rewarded by advantageous results. Therefore, temperatures appreciably below about 20° C. are not generally desirable. Temperatures substantially above about 125° C. may lead to undesirable side reactions and, hence, are to be avoided.

It is desirable, as a matter of convenience, to conduct the methylolation step at atmospheric pressures. However, pressures greater than atmospheric may be used, if desired, particularly when reaction temperatures are contemplated that are appreciably above the boiling point of the reaction mixture. The methylolation is most advantageously consummated in an alkaline medium, preferably in a pH range of about 7.2 to 11.0. Usually the pH of the reaction medium is adjusted to within the stated desired range by the addition of aqueous sodium hydroxide, potassium hydroxide, or the like. The product resulting from the methylolation of the dialkylaminoalkylurea correspond to the formula

If the $H_bMX$ compound is methylolated the product is $XM(CH_2OH)_b$ or if the quaternization, to be more fully described hereinafter, preceded the methylolation the resultant product would correspond to the formula

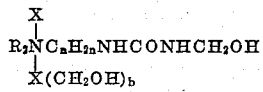

It has been pointed out that it is essential that the methylolation occur in at least two locations as far as the final quaternary ammonium compound is concerned. One location is supplied by the terminal urea nitrogen of the dialkylaminoalkylurea. Another location is supplied by the $H_bMX$ compound. The $H_bMX$ compound may supply from one to three methylolatable locations depending on the number of amino or amido groups present in M. When $H_bMX$ contains a urea or amido nitrogen one possible methylol group is clearly indicated. With the guanamines there are two possible methylolatable amino groups and with melamines there are three possible methylolatable amino groups present. It is desirable to at least methylolate and possibly etherify all possible methylolatable groups, although for the purposes of this invention a total of two methylolated groups in the final quaternary ammonium compound will produce the desired results. One methylolated group must be on the urea portion and at least one other on the M portion of the final compound as is apparent from the previous structural formula. Under present reaction conditions it has been found that substantially only one methylol group will be added on at each methylolatable location, although in some vigorously reacted instances as many as about 1.4 moles of formaldehyde have been added at each amino or amido nitrogen. Satisfactory results for the present purposes are obtained in all instances.

The methylolated compound may then be etherified, if desired, by reaction with a lower alkanol, such as methanol, ethanol, isopropanol, propanol, isobutanol, or butanol, preferably in an acidic medium. The etherification is conducted in the temperature range of about 30° to 125° C. depending largely on the individual reactants concerned. The preferred range is about 35° to 80° C. Temperatures appreciably below 30° C. lead to a sluggish reaction while temperatures considerably above 125° C. may lead to undesirable side reactions, both are therefore to be avoided. It is preferred to conduct the etherification step at atmospheric pressures. However, pressures greater than atmospheric may be used, if desired, particularly when reaction temperatures are contemplated that are appreciably above the boiling point of the reaction mixture. The etherification is most advantageously conducted in an acidic medium, preferably in a pH range of about 3.0 to 6.5. The pH of the reaction medium may be adjusted to the desired range by the addition of hydrochloric acid, phosphoric acid, or the like. It is desirable to remove from the reaction medium, as by filtration, inorganic salts formed by the adjustment of pH. The effect of the etherification is to replace the hydroxyl hydrogen with a lower alkyl group.

Anhydrous alkanols may be employed or the commercially supplied alkanols that contain water in varying amounts may be used. Satisfactory results are obtained in either case.

It is possible and quite satisfactory to conduct a mixed methylolation and etherification by employing formaldehyde and an aqueous lower alkanol, preferably first in an alkaline medium and then in an acidic medium to form a mixture of methylolated and etherified methylolated products. This is a satisfactory result since both types of products are valuable for the present purposes. In this connection, it is possible to obtain commercial solutions containing formaldehyde, water, and a lower alkanol or alkanols in varying proportions. These commercial solutions may then be employed in the methylolation and etherification steps in the manner previously set forth. The mixtures of compounds that may be obtained thereby may be advantageously employed for the present purposes. It has already been indicated that satisfactory results are obtained by merely performing the methylolating step without any subsequent etherification. With or without the etherification step, products are formed that are valuable for the instant uses.

The quaternization step is effected by reacting the dialkylaminoalkylurea, as is, methylolated, or methylolated and etherified, as the case may be, with the compound $H_bMX$, as is, methylolated, or methylolated and etherified, as the case may be. It is preferable to quaternize the dialkylaminoalkylurea with the $H_bMX$ compound and then perform the methylolation and possible etherification. The quaternization step occurs substantially quantitatively on a mole for mole basis between the selected reactants. Quaternization is achieved by heating the reactants preferably in the range of about 50° to 125° C. It is convenient to employ the reflux temperature of the reaction mixture. If desired, the reaction may be conducted in an inert organic solvent such as acetonitrile, ethanol, isopropanol, butanol, nitromethane, dimethylformamide, or the like, which may be readily removed by evaporation or distillation at the conclusion of the quaternization. The completeness of the quaternization may be indicated by the amount of ionizable halide formed in the reaction mixture and the disappearance of basicity. The quaternization reaction is readily consummated and substantially quantitative yields are consistently experienced.

The products, for the most part, are substantially colorless viscous liquids, that are easy to work with and process. The compounds of this invention are valuable as durable anti-static agents especially for the hydrophobic fibers, such as nylon, Orlon, and Dacron. They are also valuable as modifying agents for hydrophobic fibers and cellulose. The present products can be condensed, under acidic conditions, to form insoluble resins useful in ion exchange applications. The products containing a heterocycle exhibit an unusually high degree of resistivity to removal by repeated dry cleaning operations.

The compounds of the present invention and the method of preparing them may be more fully understood from the following illustrative examples in which parts by weight are used throughout.

Example 1

There are added to a three-necked flask, equipped with a thermometer, stirrer, and reflux condenser, 145 parts of dimethylaminopropylamine and 85.2 parts of urea. The mixture is heated with stirring at 120° to 122° C. and maintained at that level until the rate of reflux subsided, which is after about an hour. The temperature is gradually raised over the course of three hours to 145° C. An aminoalkylurea condensate is formed. The temperature of the system is reduced to 30° C. and there are then added 250 parts of methanol and 132 parts of chloroacetamide. The resulting solution is heated to reflux and then cooled in order to control the exothermic reaction. The reaction mixture is continued at reflux for three hours after the exothermic reaction abates. The reaction system is cooled and there are added 89.4 parts of formaldehyde and 75 parts of methanol. The pH of the system is adjusted at 8.5 with 50% aqueous sodium hydroxide. The reaction mixture is heated at 55° to 60° C. for thirty minutes. The temperature is reduced to 35° C., the pH of the system is adjusted at 4.0 with 85% phosphoric acid, and the temperature is then raised to 50° to 55° C. for one half hour. The temperature is then dropped to 32° C. and the pH of the system adjusted at 7.2 with 50% aqueous sodium hydroxide. Inorganic salts form and these are removed by filtration. Volatile components are removed by distillation under vacuum, leaving as a residual product a viscous liquid. The product corresponds to the quaternary ammonium compound of dimethylaminopropylureidomethoxymethane and chloroacetamidomethoxymethane and has the formula

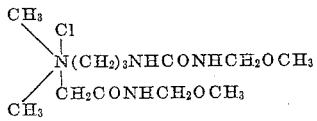

which may be named the bis methoxymethyl derivative of 3-ureidopropyl acetamido dimethyl ammonium chloride.

In a similar way, employing formaldehyde in ethanol, diethylaminopropylamine, and bromobutyramide, there is prepared the quaternary ammonium compound of diethylaminopropylureidomethoxyethane and ethoxymethylbromobutyramide.

Example 2

There are added to a reaction vessel 102 parts of dimethyaminopropylamine and 60 parts of urea. The mixture is heated at 125° to 155° C. for four hours which includes a short time after the conclusion of the evolution of ammonia. The temperature of the system is reduced and there are then introduced 500 parts of acetonitrile and 136 parts of chloroacetylurea. The temperature is increased until reflux occurs and it is held at that level for three hours. The acetonitrile is removed by distillation under vacuum and then there are added 300 parts of water and 179 parts of 37% aqueous formaldehyde. The pH is adjusted to 8 to 9 with 50% aqueous sodium hydroxide and the mixture is heated for thirty minutes at 50° to 55° C. The water is stripped off leaving the liquid product. The product is identified as the quaternary ammonium compound of methylol dimethylaminopropylurea and methylol chloroacetylurea. This product may also be named the quaternary ammonium compound of dimethylaminopropylureidomethanol and chloroacetylureidomethanol.

In like manner, there is made the quaternary ammonium compound of methylethylaminoethylureidomethoxy propane and iodododecylureidomethoxy propane by using methylethylaminoethylamine, urea, formaldehyde in propanol, and iodododeceylurea.

Example 3

There are reacted at 125° to 152° C. for four hours 60 parts of urea and 130 parts of diethylaminopropylamine. The mixture is cooled and there are then introduced 202 parts of chloroacetylmelamine and 600 parts of water. The resulting solution is heated at 90° to 100° C. for four hours. The solution is allowed to cool and when the temperature approaches room temeperature there are added 364 parts of 37% aqueous formaldehyde and enough 50% aqueous sodium hydroxide to adjust the pH at 8 to 9. The mixture is heated at 50° to 55° C. for thirty minutes. The volatile components are stripped off leaving the product as the residue. The product corresponds to the quaternary ammonium compound of diethylaminopropylureidomethanol and trimethylol chloroacetylmelamine.

There is similarly prepared the quaternary ammonium compound of diethylaminoethylureidomethoxybutane and tris(butoxymethyl)bromooctadecylmelamine by reacting diethylaminoethylamine with urea, then the urea-amine condensate with bromooctadecylmelamine, and finally the quaternized compound with formaldehyde in butanol.

Example 4

There are reacted at 120° to 148° C. in a reaction vessel, 60 parts of urea and 145 parts of morpholinopropylamine until the evolution of ammonia ceases. The urea-amine condensate formed is allowed to cool. There are added 216 parts of chlorobutanoylguanamine and 250 parts of isopropanol. The temperature is raised until reflux occurred and held at that level for four hours. The reaction mixture is allowed to cool. The pH of the system is adjusted to 7.5 to 8.5 with 50% aqueous sodium hydroxide. There are introduced 90 parts of formaldehyde and 200 parts of isopropanol. The resulting solution is heated at 55° to 65° C. for thirty minutes. The pH of the system is adjusted at 3 to 4 by the addition of hydrochloric acid and then the heating is resumed at 52° to 60° C. for thirty minutes. The system is allowed to cool and then there is added sufficient 50% aqueous sodium hydroxide to adjust the pH at 7.2 to 7.4. The mixture is filtered to remove sodium chloride. Volatile components are removed by distillation under vacuum leaving the product as the residue. The product corresponds to the quaternary ammonium compound of bis-(isopropoxymethyl)chlorobutanoylguanamine and morpholinopropylureidomethoxyisopropane.

The quaternary ammonium compound of piperidinoethylureidomethanol and dimethylol bromodecylguanamine is similarly made by condensing piperidinoethylamine with urea, then reacting the urea-amine condensate with bromodecylguanamine, and finally methylolating the quaternized compound with aqueous formaldehyde.

Example 5

There are introduced into a reaction vessel 60 parts of urea and 102 parts of dimethylaminopropylamine. The mixture is heated at 125° to 155° C. until the evolution of ammonia ceases. The urea-amine condensate is cooled. There is introduced 81 parts of 37% aqueous formaldehyde and the pH was adjusted to 7.5 to 8.0 with potassium hydroxide. The resulting solution is heated at 48° to 55° C. for one half hour. The reaction system is allowed to cool. There is then introduced 284 parts of methylolbromodecanamide, which is prepared by reacting aqueous formaldehyde with bromodecanamide. The temperature is increased until the mixture refluxes. Refluxing is continued for four hours and then the water is stripped off leaving the product as a viscous liquid residue. The product corresponds to the quaternary ammonium compound of methylol bromodecanamide and dimethylaminopropylureidomethanol. The product may be represented by the formula

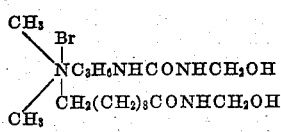

In like manner, there is made the quaternary ammonium compounds having the formulas

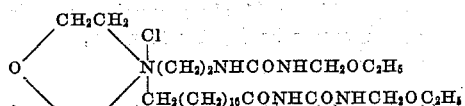

and

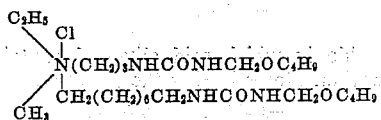

by employing, in the first case, morpholinoethylamine, octadecanoylurea, and formaldehyde in ethanol and, in the second case, methylethylaminopropylamine, chlorooctylurea, and formaldehyde in butanol.

*Example 6*

There are added to a reaction vessel 126 parts of diethylaminopropylamine and 60 parts of urea. The mixture is heated at 130° to 155° C. for four hours. The urea-amine condensate is cooled and there are then added 30 parts of formaldehyde and 200 parts of ethanol. The pH is adjusted to 8 to 9 with sodium hydroxide. The temperature of the system is raised to 50° to 55° C. and held at that level for thirty minutes. The temperature is lowered to 30° C. and the pH adjusted to 4 with phosphoric acid. The temperature is then raised to 50° to 55° C. and held there for forty minutes. The ethanol is stripped off. There are then introduced 247 parts of dimethylol chlorobutylmelamine, which is made by reacting chlorobutylmelamine with aqueous formaldehyde, and 300 parts of acetonitrile. The resulting solution is refluxed for five hours. The acetonitrile is stripped off leaving the product. The product is identified as the quarternary ammonium compound of diethylaminopropylureidomethoxyethane and dimethylol chlorobutylmelamine.

In a like manner, there is prepared the quaternary ammonium compound of dimethylaminopropylureidomethanol and tris(methoxymethyl)bromodecanolymelamine, by condensing urea with dimethylaminopropylamine, and then reacting the urea-amine condensate with aqueous formaldehyde, and finally quaternizing with tris(methoxymethyl)bromodecanoylmelamine the latter being prepared by the methoxymethylation of bromodecanoylmelamine. Similarly, the quaternary ammonium compounds of methylethylaminoethylureidomethanol and dimethoxymethyl chlorodecanoylguanamine, in the first instance, and diethylaminopropylureidomethoxyethane and dimethylol bromopropylguanamine, in the second instance, are prepared by, in the first instance, condensing ethylmethylaminoethylamine with urea, then reacting the urea-amine condensate with aqueous formaldehyde, and finally quaternizing with bis(methoxymethyl)chlorodecanoylguanamine, the latter being prepared by the methoxymethylation of chlorotetradecanoylguanamine, and, in the second instance, condensing diethylaminopropylamine with urea, then reacting the urea-amine condensate with formaldehyde and ethanol, and finally quaternizing with dimethylol bromopropylguanamine, the latter being prepared by the methylolation of bromopropylguanamine.

*Example 7*

There are introduced into a reaction vessel 60 parts of urea and 102 parts of dimethylaminopropylamine. The mixture is heated at 145° to 160° C. for four hours and then cooled. There are then added 93 parts of chloroacetamide and 100 parts of acetonitrile. The resulting solution is heated at reflux for three hours and then cooled. There is added 109 parts of Methyl Formcel (10% water, 35% methanol, and 55% formaldehyde), after which the reaction solution is adjusted to a pH of 8 to 9 with sodium hydroxide. The temperature of the system is raised to 55° to 60° C. and maintained at that level for forty-five minutes. The solution is cooled, the pH was adjusted to 4 with phosphoric acid, and heating at 50° to 55° C. is continued for one half hour. The pH is adjusted to 7.5 to 8 with sodium hydroxide and the inorganic salts formed are removed by filtration. The volatile components are removed by distillation under vacuum leaving the product as the residue. The product is identified as a mixture of quaternary ammonium compounds of dimethylaminopropylureidomethanol and dimethylaminopropylureidomethoxymethane with methylol chloroacetamide and methoxymethyl chloroacetamide.

I claim:

1. A method for the preparation of a quaternary ammonium compound having the formula

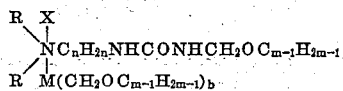

comprising the steps of reacting at a temperature of about 75° to 200° C. urea with an amine having the formula

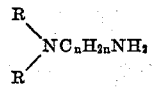

form an aminoalkylurea condensate, reacting in the range of about 50° C. to the reflux temperature of the reaction mixture said condensate with a compound having the formula $H_bMX$ to form a quaternized composition, and reacting at a temperature of about 20° to 125° C. said composition with formaldehyde and a compound having the formult $C_{m-1}H_{2m-1}OH$, in which the R's, taken singly, are alkyl groups of not over two carbon atoms each and the R's, taken collectively and jointly with the amino nitrogen, form members from the class consisting of morpholino, thiamorpholino, pyrrolidinyl, methylpiperazinyl and piyperidino, $n$ is an integer of two to three, $m$ is an integer of one to five, X is an anion having a group weight of about 35.5 to 127, $b$ is an integer of one to three, and M has at least one and no more than three methylolatable groups and is a member from the class consisting of alkanamido in which said alkan portion contains two to eighteen carbon atoms having the formula

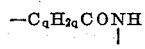

alkylureido in which said alkyl contains two to eighteen carbon atoms having the formula

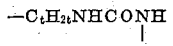

alkanoylureido in which said alkanoyl contains two to eighteen carbon atoms having the formula,

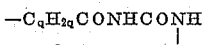

alkylguanamino in which said alkyl contains from one to eighteen carbon atoms having a formula from the group consisting of

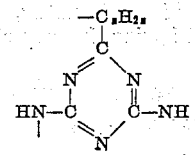

and

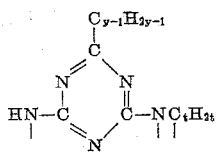

alkanoylguanamino in which said alkanoyl contains two to eighteen carbon atoms having a formula from the group consisting of

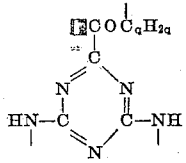

and

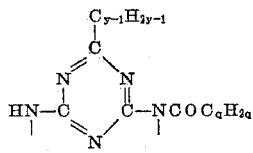

alkylmelanimo in which said alkyl contains two to eighteen carbon atoms having the formula

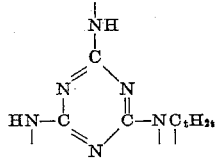

and alkanoylmelamino in which said alkanoyl contains two to eighteen carbon atoms having the formula

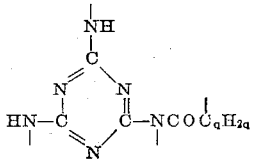

in which $q$ is an integer of one to seventeen, $t$ is an integer of two to eighteen, $y$ is an integer of one to three, and $z$ is an integer of one to eighteen, the carbon atom in M containing the free valence is attached to the amino nitrogen atom of the remainder of the molecule.

2. A method for the preparation of a quaternary ammonium compound having the formula

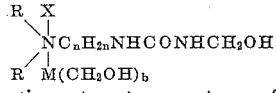

comprising reacting at a temperature of about 75° to 200° C. urea with an amine having the formula

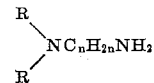

to form an aminoalkylurea condensate, reacting in the temperature range of about 50° to 125° C. said condensate with a compound having the formula $H_bMX$ to form a quaternized composition, and reacting in the temperature range of about 35° to 80° C. and at a pH of about 7.2 to 11.0 said composition with formaldehyde and water, in which the symbols R, X, M, $n$ and $b$ have the same significance as in claim 1.

3. As a composition of matter, a quaternary ammonium compound having the formula

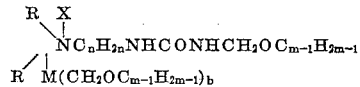

in which the R's, taken singly, are alkyl groups of not over two carbon atoms each and the R's, taken collectively and jointly with the amino nitrogen, form members from the class consisting of morpholino, thiamorpholino, pyrrolidinyl, methylpiperazinyl and piperidino, $n$ is an integer of two to three, $m$ is an integer of one to five, X is an anion having a group weight of about 35.5 to 127, $b$ is an integer of one to three, and M has at least one and no more than three methylolatable groups and is a member from the class consisting of alkanamido in which said alkan portion contains two eighteen carbon atoms having the formula,

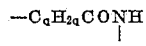

alkylureido in which said alkyl contains two to eighteen carbon atoms having the formula,

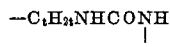

alkanoylureido in which said alkanoyl contains two to eighteen carbon atoms having the formula,

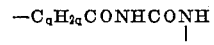

alkylguanamino in which said alkyl contains from one to eighteen carbon atoms having a formula from the group consisting of

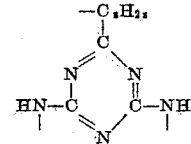

and

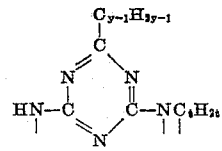

alkanoylguanamino in which said alkanoyl contains two to eighteen carbon atoms having a formula from the group consisting of

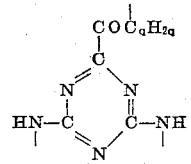

and

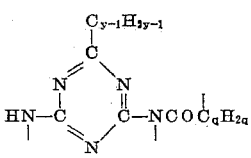

alkylmelamino in which said alkyl contains two to eighteen carbon atoms having the formula

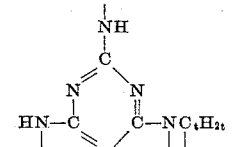

and alkanoylmelamino in which said alkanoyl contains two to eighteen carbon atoms having the formula

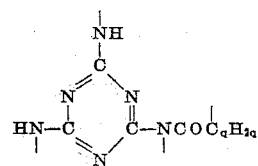

in which $q$ is an integer of one to seventeen, $t$ is an integer of two to eighteen, $y$ is an integer of one to three, and $z$ is an integer of one to eighteen, the carbon atom in M containing the free valence is attached to the amino nitrogen atom of the remainder of the molecule.

4. As a new composition of matter, a quaternary ammonium compound having the formula

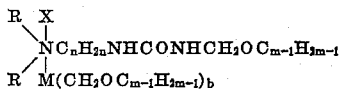

in which the R's are alkyl groups of not over two carbon atoms each, $n$ is an integer of two to three, $m$ is an integer of one to five, X is an anion having a group weight of 35.5 to 127, $b$ is an integer of one to three, and M is alkylmelamino in which said alkyl contains two to eighteen carbon atoms having the formula

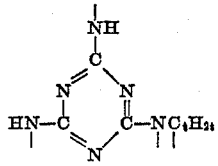

in which $t$ is an integer of two to eighteen, the carbon atom in M having the free valence is attached to the amino nitrogen atom in the remainder of the molecule.

5. As a new composition of matter, a quaternary ammonium compound having the formula

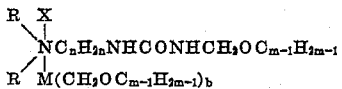

in which the R's are alkyl groups of not over two carbon atoms each, $n$ is an integer of two to three, $m$ is an integer of one to five, X is an anion having a group weight of 35.5 to 127, $b$ is an integer from one to two, and M is alkylguanamino in which said alkyl contains one to eighteen carbon atoms having the formula

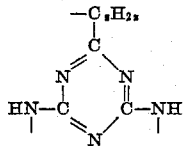

in which $z$ is an integer of one to eighteen, the carbon atom in M having the free valence is attached to the amino nitrogen atom in the remainder of the molecule.

6. As a new composition of matter, a quaternary ammonium compound having the formula

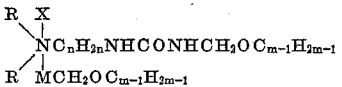

in which the R's are alkyl groups of one to two carbon atoms each, $n$ is an integer of two to three, $m$ is an integer of one to five, X is a halogen atom having an atomic weight of 35.5 to 127, and M is alkanamido in which said alkan portion contains two to eighteen carbon atoms having the formula

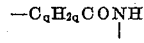

in which $q$ is an integer of one to seventeen, the carbon atom in M having the free valence is attached to the amino nitrogen atom in the remainder of the molecule.

7. As a new composition of matter, a quaternary ammonium compound having the formula

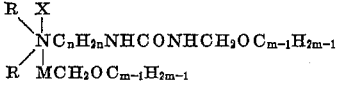

in which the R's are alkyl groups of one to two carbon atoms each, $n$ is an integer of two to three, $m$ is an integer of two to five, X is a halogen atom having an atomic weight of 35.5 to 127, and M is alkylureido in which said alkyl contains two to eighteen carbon atoms having the formula

in which $t$ is an integer of two to eighteen, the carbon atom in M having the free valence is attached to the amino nitrogen atom in the remainder of the molecule.

8. As a new composition of matter, the quaternary ammonium compound having the formula

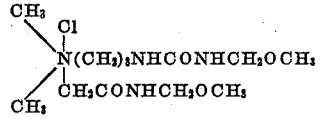

9. As a new composition of matter, the quaternary ammonium compound of dimethylaminopropylureidomethanol and chloroacetylureidomethanol.

10. As a new composition of matter, the quaternary ammonium compound of piperidinoethylureidomethanol and dimethylol bromodecylguanamine.

11. As a new composition of matter, the quaternary ammonium compound having the formula

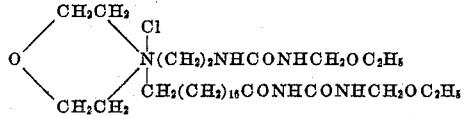

12. As a new composition of matter, the quaternary ammonium compound having the formula

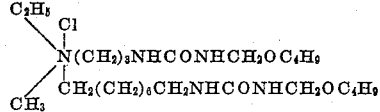

13. A method for the preparation of the quaternary ammonium compound of dimethylaminopropylureidomethoxymethane and chloroacetamidomethoxymethane which comprises reacting at a temperature of about 75° to 200° C. urea and dimethylaminopropylamine to form an aminoalkylurea condensate, reacting said condensate with chloroacetamide at a temperature of about 50° to 125° C. to form a quaternized composition, and reacting said composition with formaldehyde and methanol at a temperature of about 35° to 80° C. and at a pH of about 7.2 to 11.0 and then at a temperature of about 35° to 80° C. and at a pH of about 3.0 to 6.5.

14. As a new composition of matter, a quaternary ammonium compound having the formula

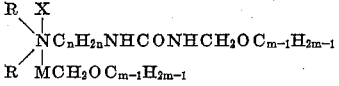

in which the R's are alkyl groups of one to two carbon atoms each, $n$ is an integer of two to three, $m$ is an integer of one to five, X is a halogen atom having an atomic weight of about 35.5 to 127, and M is alkanoylureido in which said alkanoyl contains two to eighteen carbon atoms having the formula

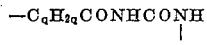

in which $q$ is an integer of one to seventeen, the carbon atom in M having the free valence is attached to the amino nitrogen atom in the remainder of the molecule.

References Cited in the file of this patent

UNITED STATES PATENTS

| | | |
|---|---|---|
| 2,203,504 | Piggott et al. | June 4, 1940 |
| 2,203,505 | Piggott | June 4, 1940 |
| 2,268,395 | Henke et al. | Dec. 30, 1941 |
| 2,315,745 | Sorenson | Apr. 6, 1943 |
| 2,616,874 | Yost | Nov. 4, 1952 |